United States Patent [19]

Mongeon

[11] Patent Number: 5,710,824
[45] Date of Patent: Jan. 20, 1998

[54] SYSTEM TO IMPROVE PRINTER GAMUT

[75] Inventor: Michael C. Mongeon, Rochester, N.Y.

[73] Assignee: Xerox Corporation, Stamford, Conn.

[21] Appl. No.: 614,599

[22] Filed: Mar. 13, 1996

[51] Int. Cl.⁶ .......................... G06K 9/00; B41B 15/00; G03F 3/08

[52] U.S. Cl. .................. 382/162; 382/167; 395/109; 358/518; 358/520

[58] Field of Search .................................. 358/461, 501, 358/520, 518, 298, 525, 529, 406, 504, 519, 222; 395/106, 109; 382/162, 167

[56] References Cited

U.S. PATENT DOCUMENTS

| | | |
|---|---|---|
| 2,790,844 | 4/1957 | Neugebauer. |
| 4,275,413 | 6/1981 | Sakamoto et al. ............... 358/80 |
| 4,500,919 | 2/1985 | Schreiber ........................ 358/78 |
| 5,305,119 | 4/1994 | Rolleston et al. .............. 358/522 |
| 5,592,311 | 1/1997 | Hibi ................................ 358/518 |

OTHER PUBLICATIONS

Shepard's Method of "Metric Interpolation" to Bivariate and Multivariate Interpolation, by: Gordon and Wixom Mathematics of Computation, vol. 32, No. 141, Jan. 1978, pp. 253–264.

Printing CIELAB Images on a CMYIL Printer Using Tri-–Linear Interpolation By: Nin, Lasson, Plouffe.

Colorimetric Calibration for Scanners & Media By: Hung.

Tetrahedral Division Technique Applied to Colorimetric Calibration for Imaging Media By: P. Hung.

*Primary Examiner*—Edward L. Coles, Sr.
*Assistant Examiner*—Kimberly A. Williams
*Attorney, Agent, or Firm*—Kevin R. Kepner

[57] ABSTRACT

In a printer which produces images as a function of the combination of cyan (C), magenta (M), yellow (Y) and black (K) colorants on an output color print, responsive to device independent colorimetric description of an image, there is provided a method of printing in a color printer so that scanned color images defined in terms of colorimetric color signals may be printed on a color printer responsive to printer colorant signals to render a color print with a set of three primary colorants and black on a substrate, the printing method comprising the ordered steps of scanning an image to derive a set of device independent colorimetric color signals, converting said colorimetric color signals into device dependent primary colorant signals, each primary colorant signal defining a density of colorant to be used in rendering a color print, said conversion accounting for a subsequent black colorant addition, determining, for minimum and maximum values of the combination of primary colorant signals a black colorant signal, to add black colorant as a nonlinear function of the primary colorant signals so as to expand the printable color gamut, to the color print, gray balancing the primary colorant signals and linearizing black to generate a set of corresponding printer colorant signals to control the printer and using said printer colorant signals to control the printer to produce an image colorimetrically matching the scanned image.

3 Claims, 5 Drawing Sheets

5,710,824

SYSTEM TO IMPROVE PRINTER GAMUT

This invention relates generally to a system to improve and extend the color gamut of a printer, and more particularly concerns a gray component replacement scheme to increase gamut boundary and improve asthetic appearance of images.

The following patents are specifically incorporated by reference:U.S. Pat. No. 5,305,119 to Rolleston for its teachings regarding producing images as a function of the combination of C, M, Y, K on an output color printer, responsive to device independent colorimetric description of an image; U.S. Pat. No. 4,500,919 to Schreiber for its teachings of a color conversion system converting information from RGB to CMYK; U.S. Pat. No. 4,275,413 to Sakamoto for its teachings of tetrahedral interpolation between first and second color spaces; and U.S. Pat. No. 2,790,844 to Neugebauer disclosing the desirability of defining an image in a first standard color space prior to conversion of the image coordinates to a second printer based coordinate system. The following articles are also hereby incorporated by reference: Po-Chieh Hung, "Tetrahedral Division Technique Applied to Colorimetric Calibration for Imaging Media", Annual Meeting IS&T, N.J., May, 1992, pp. 419–422; Po-Chieh Hung, "Colorimetric Calibration for Scanners and Media", SPIE, Vol. 1448, Camera and Input Scanner System, (1991); and Sigfredo I. Nin, etal., "Printing CIELAB Images on a CMYK Printer Using Tri-Linear Interpolation", SPIE Proceedings, Vol. 1670, 1992, pp. 316–324.

The generation of color documents can be thought of as a two step process: first, the generation of the image by means of scanning an original document with a color image input terminal or scanner or, alternatively, creating a color image on a work station operated in accordance with a color image creation program; and secondly, printing of that image with a color printer in accordance with the colors defined by the scanner or computer generated image. Scanners typically operate with colors defined in a color space of tristimulus values, i.e., RGB (red-green-blue). Commonly, these values are a linear transformation of the standard XYZ coordinates of CIE color space, or another transform of those values.

Printers have an output which can be defined as existing in a color space called CMYK (cyan, magenta, yellow, key or black) which is uniquely defined for the printer by its capabilities and colorants. Printers operate by the addition of multiple layers of ink or colorant in layers or halftone dots to a page. The response of the printer tends to be non-linear. Thus, while a printer receives information in a first color space which has values defined independently of any device, it must convert that information to print in a second color space which is dependent of device characteristics.

The desirability of operating in a tristimulus color space with subsequent conversion to a printer colorant color space is well known, as shown by U.S. Pat. No. 4,500,919 to Schreiber, U.S. Pat. No. 2,790,844 to Neugebauer, and U.S. Pat. No. 4,275,413 to Sakamoto. There are many methods of conversion between color spaces, all of which begin with the measurement of printer response to certain input values. Commonly, a printer is driven with a set of color input values, the values are printed in normal operation of the printer, and measurements are made of those colors to determine what the actual color printed was in response to the color specification. As previously noted, most printers have non-linear response characteristics.

The calibration of a printer involves the process of finding what set of signals must be sent to a printer to obtain a desired color. The desired color is described in some device independent terminology (i.e. some well defined standard), and the signals to the printer constitute a device dependent terminology. A complete calibration will transform the device independent color description into a device dependent description such that the resultant combination of materials (i.e. ink, toner, dye, etc.) on the paper produces the desired color (i.e. the color which was initially described in a device independent fashion).

The calibration of high quality printers can be divided into three major tasks, (1) setting gray balance (denoted by GB), (2) determining black addition (sometimes K+) and under color removal, if any (termed "UCR"); and finally (3) color correction or color transformation.

Gray balance consists of determining what combination of inks are needed to produce a neutral gray of a desired density. Since black ink is neutral, only the combination of CMY inks must be determined. The black channel of the printer is linearized such that the reflectance from black ink is a linear function of the input signal. Because of unwanted absorption, printer non-linearities and other effects, it is generally not the case that equal amounts of CMY ink will produce a neutral color, but it is useful to define a CMY signal for which this is the case. When the gray balanced printer is given equal amounts of CMY as input signals, it will put down the amounts of cyan, magenta, and yellow ink that is needed to produce a neutral color. This generally means that the ink amounts on paper will not be equal, but the final color will be neutral.

In U.S. Pat. No. 4,500,919 to Schreiber, and U.S. Pat. No. 4,275,413 to Sakamoto, the information derived from patch measuring was placed into look-up tables, stored in a memory, perhaps ROM memory or RAM memory where the look-up table relates input color space to output color space. The look-up table is commonly a three dimensional table since color space is three dimensional. With a scanner or computer, the RGB space can be defined as three dimensional with black at the origin of a three dimensional coordinate system (0,0,0), and white at the maximum of a three dimensional coordinate system which an 8-bit system, would be located at (255, 255, 255). Each of the three axes radiating from the origin point therefore respectively define red, green, and blue. A similar construct can be made for the printer, with axes representing cyan, magenta, and yellow. Black is usually a separate toner which is added separately. In the 8-bit system suggested there will be, however, over 16 million possible colors ($256^3$). There are clearly too many values for a 1:1 mapping of RGB to CMYK. Accordingly, as proposed in U.S. Pat. No. 4,275,413 to Sakamoto, only a relatively small number of samples are made at the printer, perhaps on the order of 1,000, or even less. Therefore, the look-up tables consist of a set of values which could be said to be the intersections for corners of a set of rectangular parallel-pipeds mounted on top of one another. Colors falling within each rectangular volume can be interpolated from the measured values, through many methods including tri-linear interpolation, tetrahedral interpolation, polynomial interpolation, linear interpolation, and any other interpolation method depending on the accuracy of the desired result.

All of the references cited herein are incorporated by reference for their teachings.

In accordance with the invention, in a printer which produces images as a function of the combination of cyan (C), magenta (M), yellow (Y) and black (K) colorants on an output print, there is provided a method of printing in a color printer so that scanned color images defined in terms of colorimetric color signals may be printed on a color printer responsive to printer colorant signals to render a color print with a set of three primary colorants and black on a substrate, the printing method comprising the ordered steps of scanning an image to derive a set of device independent colorimetric color signals, converting said colorimetric color signals into device dependent primary colorant signals, each primary colorant signal defining a density of colorant to be used in rendering a color print, said conversion accounting for a subsequent black colorant addition, determining, as a function of minimum and maximum values of the combination of primary colorant signals a black colorant signal, to add black colorant as a nonlinear function of the primary colorant signals so as to expand the printable color gamut, to the color print, gray balancing the primary colorant signals and linearizing black to generate a set of corresponding printer colorant signals to control the printer and using said printer colorant signals to control the printer to produce an image colorimetrically matching the scanned image.

In accordance with one aspect of the invention, in a printer which produces images as a function of the combination of cyan (C), magenta (M), yellow (Y) and black (K) colorants on an output print, responsive to device independent colorimetric description of an image, there is provided a method of extending the color gamut of a color printer so that color images defined in terms of colorimetric color signals may be printed on a color printer responsive to printer colorant signals to render color prints with a set of three primary colorants and black on a substrate, the method comprising the ordered steps of:

a) linearizing the printer response by:
  i) producing a set of printer colorant signals to print a corresponding set of varying density samples of each of the three primary colorants and black on a substrate,
  ii) determining $\Delta E_p$ between the printer colorant signals and the substrate; and
  iii) lid generating a printer linearization table for each of the three primary colorants and black, whereby a linear increase in a colorant signal produces a linear increase in a printer colorant signal;
b) determining, for a given density characteristic of a combination of primary colorant signals to generate a color on the substrate, a black colorant signal, to add black to a color print as a nonlinear function of the primary colorant signals so as to expand the printable color gamut;
c) producing a color transform and correction table by:
  i) producing a second set of printer colorant signals of colors from combinations of the three primary colorants, with black colorant signals added in accordance with the determined density characteristic of the combination of primary colorant signals, to print a corresponding set of color samples from combination of the three primary colorants and black on a substrate,
  ii) measuring the color of each printed color sample in terms of colorimetric color signals, and
  iii) generating a color transformation table mapping measured colors in terms of the three primary colorants used to generate the color samples to colorimetric color signals;
d) storing an addressable mapping of colorimetric color signals to colorant signals in a printer memory.

In accordance with yet another aspect of the invention there is provided a method of printing in a color printer so that scanned color images defined in terms of colorimetric color signals may be printed on a color printer responsive to printer colorant signals to render a color print with a set of three primary colorants and black on a substrate, the printing method comprising the ordered steps of:

scanning an image to derive a set of device independent colorimetric color signals;

converting said colorimetric color signals into device dependent primary colorant signals, each primary colorant signal defining a density of colorant to be used in rendering a color print, said conversion accounting for a subsequent black colorant addition;

determining, as a function of minimum and maximum values of the combination of primary colorant signals a black colorant signal, to add black colorant so as to expand the printable color gamut to the color print as a nonlinear function of the primary color signals;

linearizing each primary colorant signal and black with respect to $\Delta E_p$ to generate a set of corresponding printer colorant signals to control the printer; and using said printer colorant signals to control the printer to produce an image colorimetrically matching the scanned image.

In accordance with yet another aspect of the invention there is provided a method of printing in a color printer so that scanned color images defined in terms of colorimetric color signals may be printed on a color printer responsive to printer colorant signals to render a color print with a set of three primary colorants and black on a substrate, the printing method comprising the ordered steps of:

scanning an image to derive a set of device independent colorimetric color signals;

converting said colorimetric color signals into device dependent primary colorant signals, each primary colorant signal defining a density of colorant to be used in rendering a color print, said conversion accounting for a subsequent black colorant addition;

determining, as a function of minimum and maximum values of the combination of primary colorant signals a black colorant signal, to add black colorant as a nonlinear function of the primary colorant signals so as to expand the printable color gamut, to the color print;

gray balancing the primary colorant signals and linearizing black to generate a set of corresponding printer colorant signals to control the printer; and using said printer colorant signals to control the printer to produce an image colorimetrically matching the scanned image.

These and other aspects of the invention will become apparent from the following descriptions to illustrate a preferred embodiment of the invention read in conjunction with the accompanying drawings in which.

Figure 1:
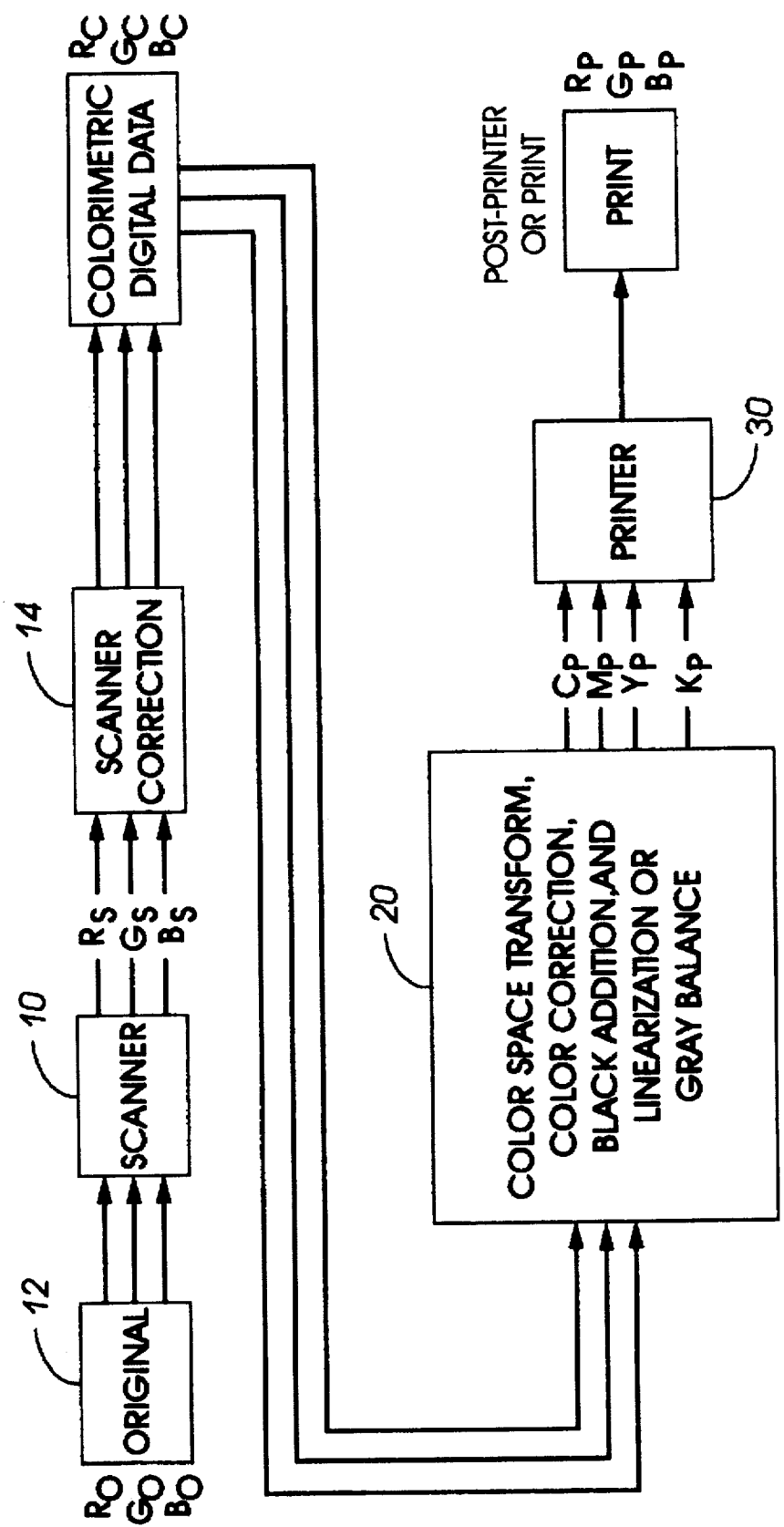
FIG. 1 is a block diagram of a scanning/printing system with color transformation, for converting device independent image descriptions to device dependent image descriptions.

Referring now to the drawings where the showings are for the purpose of describing an embodiment of the invention and not for limiting same, a basic system for carrying out the present invention is shown in FIG. 1. In a simple system model, a scanner 10, such as perhaps the color scanner available in the Xerox 5760 digital color printers, which can be calibrated to produce a set of digital colorimetric or device independent data describing a scanned image 12, which, by definition can be defined in terms of r g b space. Resulting from the scanning operation is a set of scanner image signals $R_s, G_s, B_s$, defined in device dependent scanner terms. Incorporated into the scanner or another processing path is a post-scanning processor 14, which provides correction of scanner image signals $R_s, G_s, B_s$ to colorimetric terms, typically digital in nature $R_c, G_c, B_c$. The values may be in terms of CIE color space (rgb), or the L*a*b* luminance-chrominance space ($LC_1C_2$). A color space transform, indicated by block 20, such as that described in U.S. Pat. No. 4,275,413 to Sakamoto, is used to convert the device independent data to device dependent data. The output of color space transform 20 is the image defined in terms of a device dependent space, or colorant values $C_p$, $M_p$, $Y_p$, $K_p$ that will be used to drive a printer 30. In one possible example, the colorant values represent the relative amounts of cyan, magenta and yellow toners that are to be deposited over a given area in an electrophotographic printer, such as, again, Xerox 5760 digital color printers. The printed output image may be said to be defined in terms of $R_p, G_p, B_p$, which is hoped to have a relationship with $R_o, G_o, B_o$ such that the printer has a color that is colorimetrically similar to the original image, although that similarity is ultimately dependent upon the gamut of the printing device.

Figure 2:
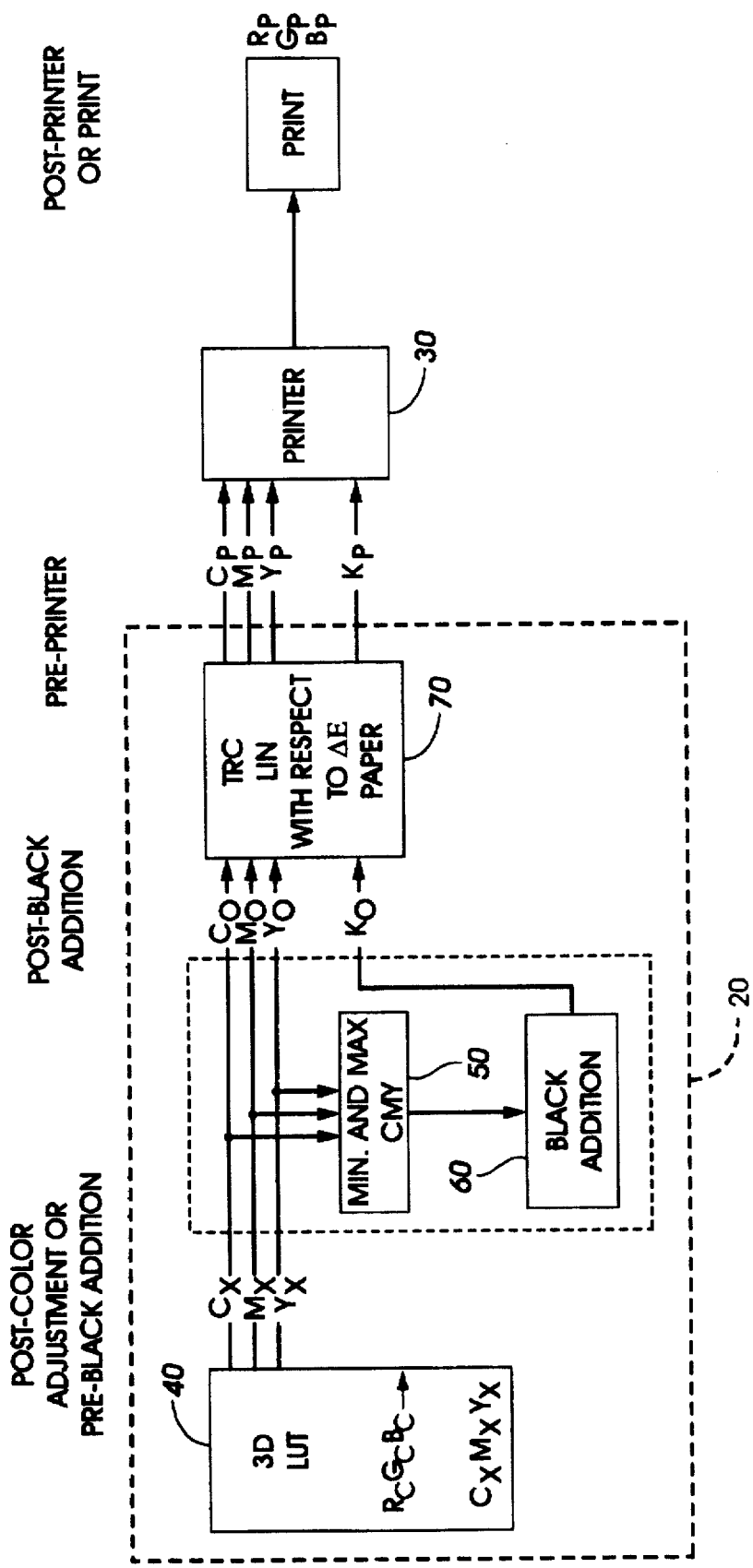
FIG. 2 is a block diagram of a portion of the printing system of FIG. 1, showing modification of the device dependent image descriptions to accommodate an individual printer.

With reference now to FIG. 2, and color space transformation and color correction 20, initially, $R_c$, $G_c$, $B_c$ color signals are directed to a three dimensional look up table stored in a device memory such as a ROM or other addressable memory device, which will meet speed and memory requirements for a particular device. Color signals $R_c$, $G_c$, $B_c$ are processed to generate address entries to the table which stores a set coefficients with which the $R_c$, $G_c$, $B_c$ may be processed to convert them to $C_x$, $M_x$, $Y_x$ colorant signals. Values which are not mapped may be determined through interpolation.

It will no doubt be recognized that there are many methods of providing a transform from device independent data to device dependent data, with U.S. Pat. No. 4,275,413 to Sakamoto describing one method, which itself can be varied. Once a conversion table is established, a method of interpolation referred to as tri-linear or cubic interpolation may also be used to calculate output values from the limited set of input values. The values stored in the look-up table can be empirically derived, as in Sakamoto, or calculated or extrapolated based on empirical information, as in Po-Chieh Hung, "Tetrahedral Division Technique Applied to Colorimetric Calibration for Imaging Media", Annual Meeting IS&T, N.J., May, 1992, pp. 419–422; Po-Chieh Hung, "Colorimetric Calibration for Scanners and Media", SPIE, Vol. 1448, Camera and Input Scanner System, (1991); and Sigfredo I. Nin, et al., "Printing CIELAB Images on a CMYK Printer Using Tri-Linear Interpolation", SPIE Proceedings, Vol. 1670, 1992, pp. 316–324. The construction of the set of values stored for the present invention will be discussed hereinbelow.

Figure 3:
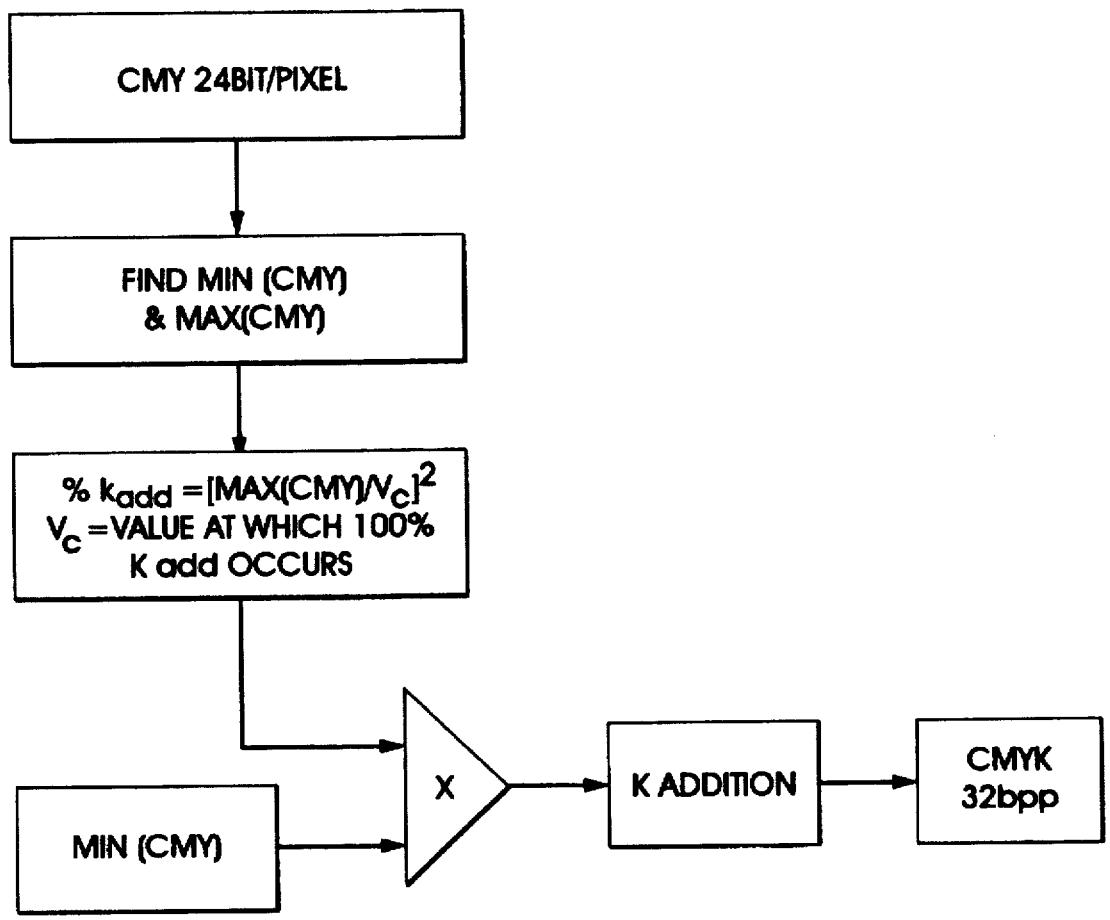
FIG. 3 shows a block diagram of a preferred scheme for addition of black to CMY values which produces an extended color gamut.

With reference again to FIG. 2, upon obtaining device dependent colorant signals $C_x$, $M_x$, $Y_x$, black addition (K+) is performed in accordance with the block diagram illustrated in FIG. 3. Subsequent to black addition, the color values are linearized, so that linearly increasing values of colorants produce a linearly increasing colorimetric response. The linearization process is implemented via a set of look-up tables with respect to $\Delta E_p$, which is the square root of the sum of the squares of the differences between L* a* b* of the $C_oM_oY_oK_o$ values of the image and paper. These values $C_pM_pY_pK_p$ are then used to drive printer 30.

The amount of black addition is an important consideration in printer rendition strategies. Factors such as gamut extension, image graininess, and toner consumption must be balanced. FIG. 3 is a block diagram illustrating a parabolic % GRC function based on Maximum CMY and resulting in K addition with no undercolor removal (UCR). The illustrated function achieves the following objectives:

the gradual addition of K throughout the gamut to avoid sudden jumps in toner layer thickness, and 100% K addition at the gamut boundaries for fully saturated primary and secondary colors and no CMY removal so as to maximize the lower gamut boundaries.

The illustrated function operates on a pixel by pixel basis but may be encoded into a CIELAB to CMYK look-up table (LUT). In a preferred embodiment, a parabolic GCR function is applied based on the maximum CMY pixel value. The % GCR is multiplied by the grey component (Min CMY) to equal the black addition. Additionally, there is no CMY removal used in this scheme so as to maximize the color gamut.

Figure 4:
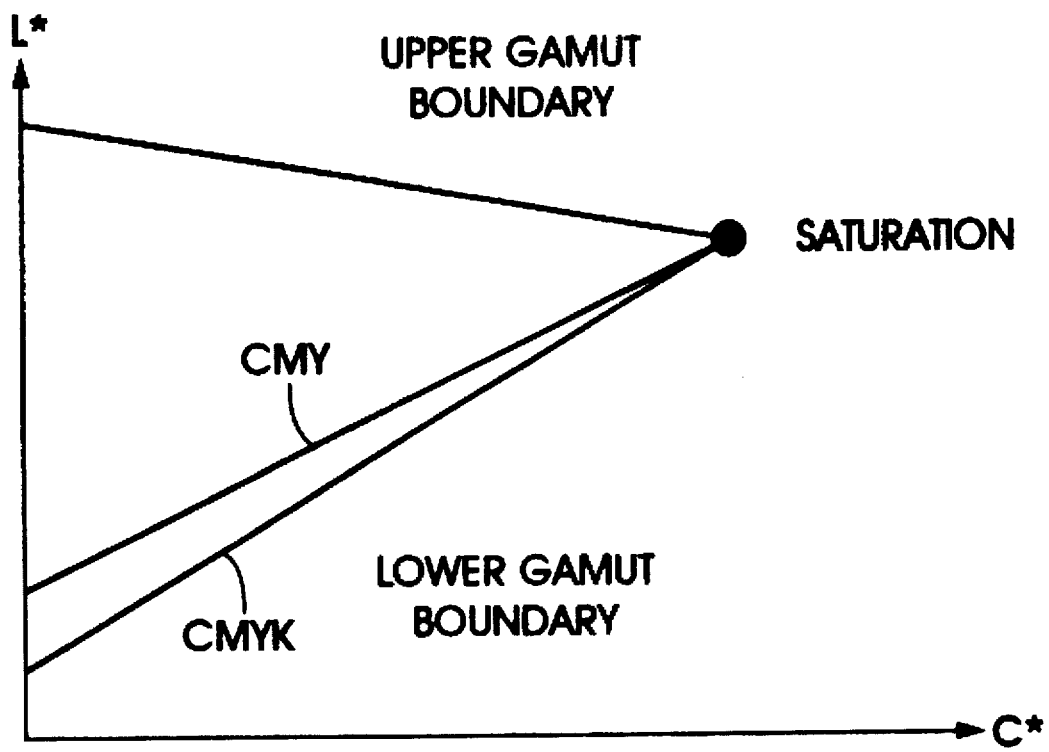
FIG. 4 shows a schematic illustrating the increase in gamot that can be achieved utilizing the black addition described herein.

FIG. 4 displays colorimetric data from the RED hue leaf with two GCR applications. The upper hue leaf represents 0% K addition and the lower hue leaf represents 100% k addition at the lower gamut boundary. Note, the decrease in L* using 100% K addition, and the increase in gamut volume in the lower gamut region.

Figure 5:
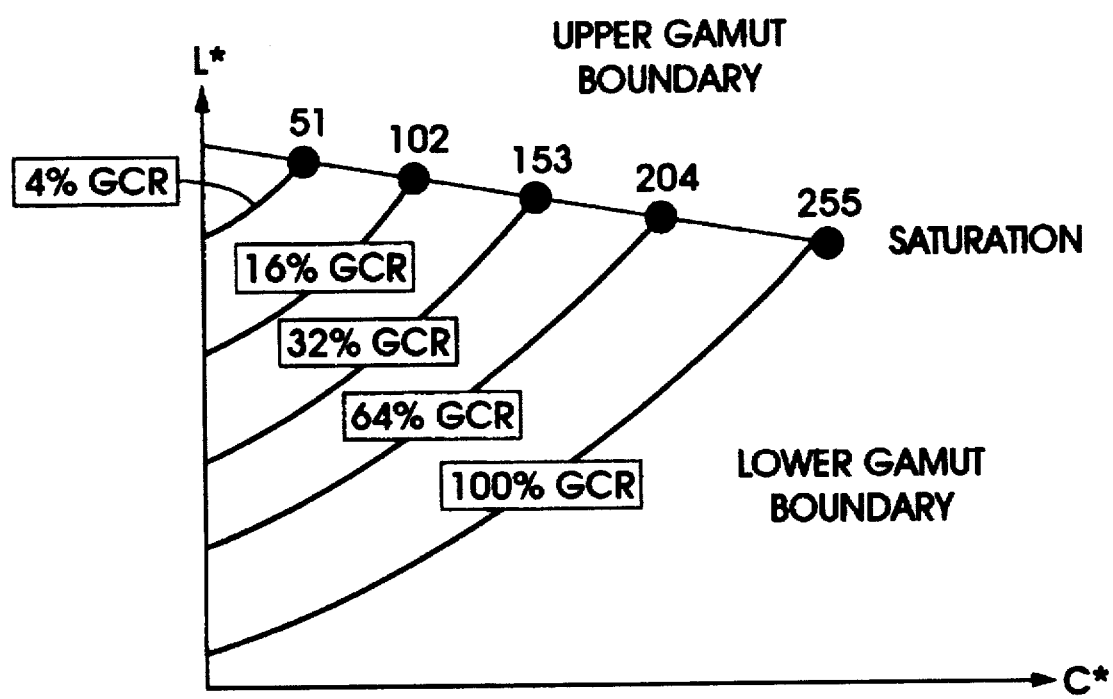
FIG. 5 shows the application of a parabolic black addition in 20% intervals in maximum CMY.

FIG. 5 illustrates the application of a parabolic % GCR function at 20% steps in Maximum(CMY). This illustrates again that at saturation, there is 100% GCR at the gamut boundary. However, at lower levels, the GCR is reduced nonlinearly so as to increase the gamut volume as much as possible without degradation of the image appearance.

In recapitulation, there is provide a printer which produces images as a function of the combination of cyan (C), magenta (M), yellow (Y) and black (K) colorants on an output color print, responsive to device independent colorimetric description of an image, there is provided a method of printing in a color printer so that scanned color images defined in terms of colorimetric color signals may be printed on a color printer responsive to printer colorant signals to render a color print with a set of three primary colorants and black on a substrate, the printing method comprising the ordered steps of scanning an image to derive a set of device independent colorimetric color signals, converting said colorimetric color signals into device dependent primary colorant signals, each primary colorant signal defining a density of colorant to be used in rendering a color print, said conversion accounting for a subsequent black colorant addition, determining, minimum and maximum values of the combination of primary colorant signals a black colorant signal, to add black colorant as a nonlinear function of the primary colorant signals so as to expand the printable color gamut, to the color print, gray balancing the primary colorant signals and linearizing black to generate a set of corresponding printer colorant signals to control the printer and using said printer colorant signals to control the printer to produce an image colorimetrically matching the scanned image.

It is, therefore, apparent that there has been provided in accordance with the present invention, a method for black addition to CMY values in a color printer that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A method of expanding the color gamut of a color printer so that color images defined in terms of colorimetric color signals may be printed on a color printer responsive to printer colorant signals to render color prints with a set of three primary colorants and black on a substrate, the method comprising the ordered steps of:

a) linearizing the printer response by:
      i) producing a set of printer colorant signals to print a corresponding set of varying density samples of each of the three primary colorants and black on a substrate,
      ii) determining $\Delta E_p$ between the printer colorant signals and the substrate; and
      iii) generating a printer linearization table for each of the three primary colorants and black whereby a linear increase in a colorant signal produces a linear increase in a printer colorant signal;

b) determining, for a given density characteristic of a combination of primary colorant signals to generate a color on the substrate, a black colorant signal, to add black to a color print as a nonlinear function of the primary colorant signals so as to expand the printable color gamut;

c) producing a color transform and correction table by:
      i) producing a second set of printer colorant signals of colors from combinations of the three primary colorants, with black colorant signals added in accordance with the determined density characteristic of the combination of primary colorant signals, to print a corresponding set of color samples from combination of the three primary colorants and black on a substrate,
      ii) measuring the color of each printed color sample in terms of colorimetric color signals, and
      iii) generating a color transformation table mapping measured colors in terms of the three primary colorants used to generate the color samples to colorimetric color signals;

d) storing an addressable mapping of colorimetric color signals to colorant signals in a printer memory.

2. A method of printing in a color printer so that scanned color images defined in terms of colorimetric color signals may be printed on a color printer responsive to printer colorant signals to render a color print with a set of three primary colorants and black on a substrate, the printing method comprising the ordered steps of:

scanning an image to derive a set of device independent colorimetric color signals;

converting said colorimetric color signals into device dependent primary colorant signals, each primary colorant signal defining a density of colorant to be used in rendering a color print, said conversion accounting for a subsequent black colorant addition;

determining, as a function of minimum and maximum values of the combination of primary colorant signals a black colorant signal, to add black colorant so as to expand the printable color gamut to the color print as a nonlinear function of the primary color signals;

linearizing each primary colorant signal and black with respect to $\Delta E_p$ to generate a set of corresponding printer colorant signals to control the printer; and using said printer colorant signals to control the printer to produce an image colorimetrically matching the scanned image.

3. A method of printing in a color printer so that scanned color images defined in terms of colorimetric color signals may be printed on a color printer responsive to printer colorant signals to render a color print with a set of three primary colorants and black on a substrate, the printing method comprising the ordered steps of:

scanning an image to derive a set of device independent colorimetric color signals;

converting said colorimetric color signals into device dependent primary colorant signals, each primary colorant signal defining a density of colorant to be used in rendering a color print, said conversion accounting for a subsequent black colorant addition;

determining, as a function of minimum and maximum values of the combination of primary colorant signals a black colorant signal, to add black colorant as a nonlinear function of the primary colorant signals so as to expand the printable color gamut, to the color point, wherein the black colorant is added as a parabolic function of the primary colorants;

gray balancing the primary colorant signals and linearizing black to generate a set of corresponding printer colorant signals to control the printer; and using said printer colorant signals to control the printer to produce an image colorimetrically matching the scanned image.

* * * * *